(12) United States Patent
Usui et al.

(10) Patent No.: US 6,515,960 B1
(45) Date of Patent: Feb. 4, 2003

(54) RADIO COMMUNICATION SYSTEM

(75) Inventors: Takashi Usui, Tokyo (JP); Hisaki Hiraiwa, Kanagawa (JP); Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/139,892

(22) Filed: Aug. 25, 1998

(30) Foreign Application Priority Data

Aug. 27, 1997  (JP) ............................................. 9-231174

(51) Int. Cl.$^7$ ................................................ H04J 11/00
(52) U.S. Cl. ........................ 370/203; 370/350; 370/478
(58) Field of Search ................................. 370/355, 350, 370/478, 203, 208

(56) References Cited

U.S. PATENT DOCUMENTS

| | | | | |
|---|---|---|---|---|
| 5,488,631 A | * | 1/1996 | Gold et al. .................. | 375/206 |
| 5,790,784 A | * | 8/1998 | Beale et al. ........... | 395/200.01 |
| 5,819,000 A | * | 10/1998 | Oshima ........................ | 386/46 |
| 5,889,759 A | * | 3/1999 | McGibney .................. | 370/207 |
| 6,084,871 A | * | 7/2000 | Engstrom et al. ........... | 370/350 |
| 6,128,276 A | * | 10/2000 | Agee ........................... | 370/208 |
| 6,285,654 B1 | * | 9/2001 | Marchok et al. ............ | 370/208 |

* cited by examiner

Primary Examiner—Chau Nguyen
Assistant Examiner—Ron Abelson
(74) Attorney, Agent, or Firm—Jay H. Maioli (57) ABSTRACT

A radio communication system is formed of a plurality of radio communication terminals and a radio communication control terminal for controlling radio communication. Data communication is performed between each radio communication terminal and the radio communication control terminal by the orthogonal frequency division multiplexing (OFDM) method. Data is multiplexed with a frame structure having the specified number of symbols by the TDMA method. The radio communication control terminal transmits a synchronization acquisition code to the plurality of radio communication terminals in each frame. Each radio communication terminal receives the synchronization acquisition code, sets a timer according to the receiving timing of the synchronization acquisition code, and sets the transmission timing and the receiving timing with the timer being used as the reference. With the use of the OFDM method, demodulation is performed without an error even if jitter occurs. Since the timing of transmission and receiving is set with an M sequence at the top of a frame being used as a reference, the timer of each radio communication terminal is set to the same time. With the use of this time information, only necessary symbols in a frame are demodulated to reproduce the data at receiving.

7 Claims, 8 Drawing Sheets

RADIO COMMUNICATION SYSTEM

BACKGROUND OF THE INVENTION

1. Field of the Invention

The present invention relates to a radio communication system suited to a radio local area network in which a plurality of terminals are connected by radio.

2. Description of the Related Art

As computers have become highly functional, it has been frequently performed that a plurality of computers are connected to form a local area network (LAN) in order to share files and data and to transfer data and electronic mail. In a conventional LAN, computers are connected by wire with the use of optical fibers, coaxial cables, or twisted pair cables.

In such a wired LAN, since connection work is required, it is difficult to form a LAN easily. In addition, cable wiring is troublesome in a wired LAN. Therefore, a radio LAN has drawn attention as a system which releases the user from wiring required for the conventional wired LAN.

A radio LAN has been proposed in which data communication is performed by the code division multiple access (CDMA) method with the use of spread spectra. In the CDMA method, data to be transmitted is multiplied by a pseudo noise (PN) code to spread the spectra of the data to be transmitted. The sent data with its spectra being spread is demodulated by multiplying the PN code which is the same as that used in the transmission side. The CDMA method features a high privacy in communication and a strength against interference.

In recent years, information has been distributed in multimedia and large data in size, such as image and sound data, has been handled in many cases. Therefore, it is demanded that a radio LAN provide a higher transfer rate so as to transmit large data such as image and sound data. In spread spectrum modulation, when data is transferred at a high rate of about 30 Mbps, for example, a bandwidth of more than 300 MHz is required. Such a wide bandwidth cannot be obtained in the current frequency allocation. In addition, it is difficult to perform communication with such a wide bandwidth.

In spread spectrum transfer, a synchronization acquisition time is required in demodulation in order to achieve phase matching between the sent data code and a code generated by a receiver for demodulation. To implement this, a bit string for synchronization is inserted into each packet in spread spectrum transfer for high-speed synchronization acquisition. Due to this bit string for synchronization, the number of bits other than those of effective data increases.

SUMMARY OF THE INVENTION

Accordingly, an object of the present invention is to provide a radio communication system which allows high-speed data transfer and which allows the timing of transmission and receiving to be set without providing a number of synchronization bits.

The above object is achieved in one aspect of the present invention through the provision of a radio communication system including: a plurality of radio communication terminals for data communication and a radio communication control terminal for controlling radio communication, the radio communication control terminal including: transmission means and receiving means performing data transmission and receiving by the OFDM method, and synchronization-code generating means for generating a code sequence for synchronization acquisition, and each of the plurality of radio communication terminals including: transmission means and receiving means performing data transmission and receiving by the OFDM method; synchronization-code detecting means for detecting the code sequence for synchronization acquisition; and timer means set by the synchronization-code detecting means, wherein data is modulated by the OFDM method and the data is multiplexed by the TDMA method with a frame structure having the specified number of symbols, between each of the plurality of radio communication terminals and the radio communication control terminal, the radio communication control terminal transmits the code for synchronization acquisition to the plurality of radio communication terminals in each frame, and each of the plurality of radio communication terminals receives the code for synchronization acquisition, sets the timer means according to the receiving timing of the code for synchronization acquisition, and sets the transmission timing and the receiving timing with the timer means being used as the reference.

The foregoing object is achieved in another aspect of the present invention through the provision of a transmission apparatus including: an OFDM signal generating section; and synchronization-code generating means for generating a code sequence for synchronization acquisition, wherein a signal in which data is modulated by the OFDM method and the data is multiplexed by the TDMA method with a frame structure having the specified number of symbols, and the code for synchronization acquisition are transmitted.

The foregoing object is achieved in still another aspect of the present invention through the provision of a receiving apparatus including: an OFDM signal receiving section; and synchronization-code detecting means for detecting a code sequence for synchronization acquisition, wherein the code for synchronization acquisition is received and the receiving timing is set according to the code.

The foregoing object is achieved in yet another aspect of the present invention through the provision of a transmission method including the steps of: generating an OFDM signal; and generating a code sequence for synchronization acquisition, wherein a signal in which data is modulated by the OFDM method and the data is multiplexed by the TDMA method with a frame structure having the specified number of symbols, and the code for synchronization acquisition are transmitted.

The foregoing object is achieved in a further aspect of the present invention through the provision of a receiving method including the steps of: receiving an OFDM signal; and detecting a code sequence for synchronization acquisition, wherein the code for synchronization acquisition is received and the receiving timing is set according to the code.

DESCRIPTION OF THE PREFERRED EMBODIMENT

An embodiment of the present invention will be described below by referring to the drawings.

Figure 1:
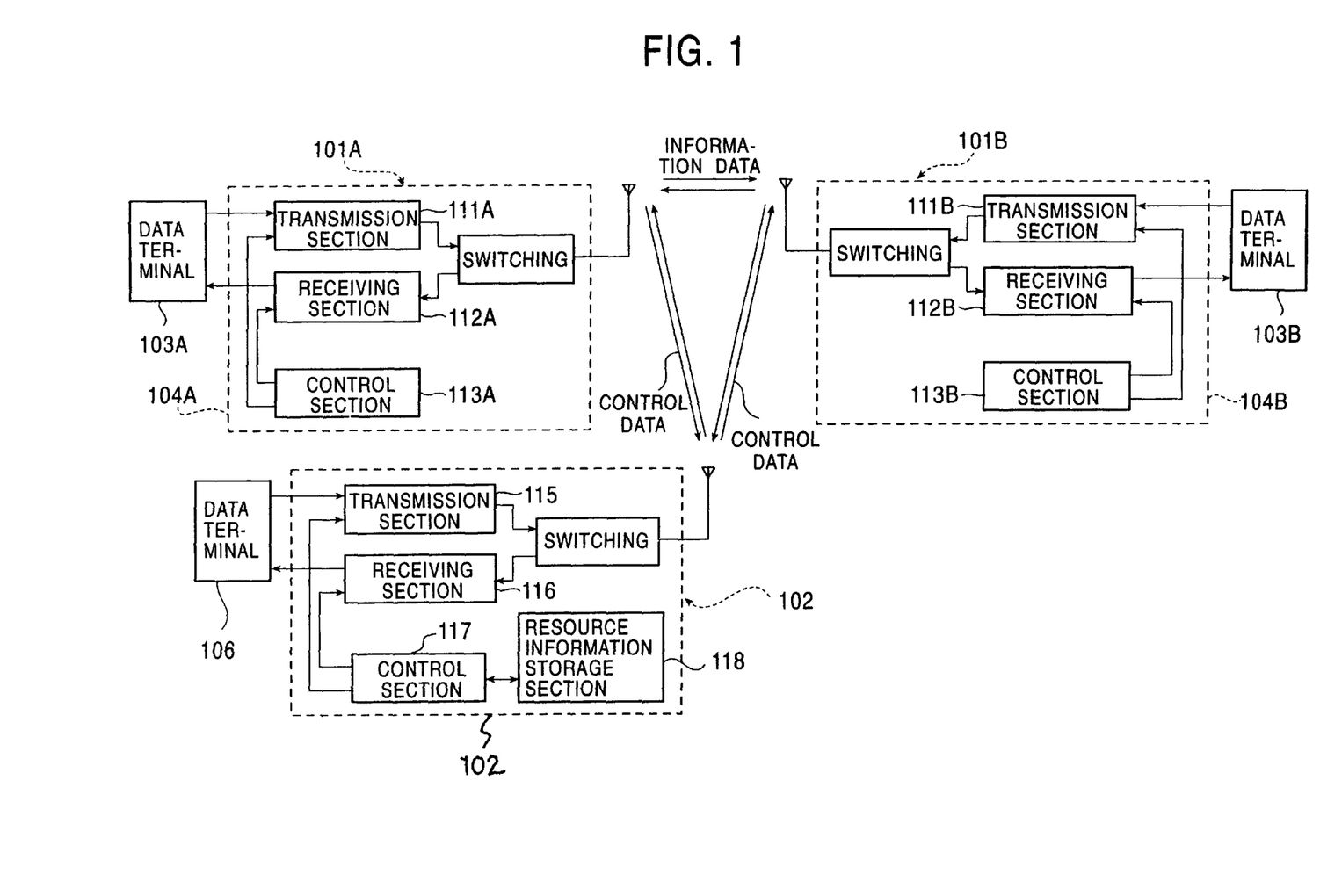
FIG. 1 is a block diagram of a radio LAN system according to an embodiment of the present invention.

FIG. 1 shows outlines of a radio LAN system to which the present invention is applied. This radio LAN system includes a plurality of radio communication terminals 101A, 101B, . . . and a radio communication control terminal 102. The radio communication terminals 101A, 101B, . . . are formed of radio communication units 104A, 104B, . . . and data terminals 103A, 103B, . . . such as computers, both of which are connected. The radio communication control terminal 102 is formed of a radio communication unit 105 and a data terminal 106 both of which are connected. Data is transferred between the plurality of radio terminals 101A, 101B, . . . . The radio communication control terminal 102 controls data communication between the plurality of radio communication terminals 101A, 101B, . . . . The radio communication control terminal 102 can be configured only by the radio communication unit 105.

The radio communication units 104A, 104B, . . . in the radio communication terminals 101A, 101B, . . . are respectively formed of transmitting sections 111A, 111B, . . . , receiving sections 112A, 112B, . . . , and control sections 113A, 113B, . . . . The transmitting sections 111A, 111B, . . . and the receiving sections 112A, 112B, . . . are formed such that data communication can be performed by radio in the orthogonal frequency division multiplexing (OFDM) method.

The radio communication unit 105 in the radio communication control terminal 102 is formed of a transmitting section 115, a receiving section 116, and a control section 117. The transmitting section 115 and the receiving section 116 are formed such that data communication can be performed by radio in the OFDM method. The radio communication unit 105 in the radio communication control terminal 102 is provided with a resource-information storage section 118 for storing resource information related to the time period assigned to each radio communication terminal for data communication.

In this system, data communication is performed by the OFDM method. One frame is formed, for example, of 147455 symbols (corresponding to four milliseconds) of the OFDM method, and data is transmitted in the frame in the time division multiple access (TDMA) method.

At the top of one frame, the radio communication unit 105 in the radio communication control terminal 102 transmits an M-sequence code for acquiring synchronization. Each of the radio communication units 104A, 104B, . . . in the radio communication terminals 101A, 101B, . . . receives the M-sequence code for acquiring synchronization and sets the timing of data transmission and receiving with this receiving timing being used as the reference.

When the radio communication terminals 101A, 101B, . . . have data communication requests, the radio communication units 104A, 104B, . . . in the radio communication terminals 101A, 101B, . . . send transmission requests to the radio communication unit 105 in the radio communication control terminal 102. According to the transmission requests and the resource information, the radio communication unit 105 in the radio communication control terminal 102 determines the transmission time periods assigned to the radio communication terminals 101A, 101B, . . . , and sends control information, including the transmission time periods, to the radio communication units 104A, 104B, . . . of the radio communication terminals 101A, 101B, . . . . The radio communication units 104A and 104B of the radio communication terminals 101A and 101B perform data transmission and receiving according to the assigned transmission time periods. Data is transmitted or received with the M-sequence code for acquiring synchronization being used as a timing reference, which is sent at the top of a frame.

Figure 2:
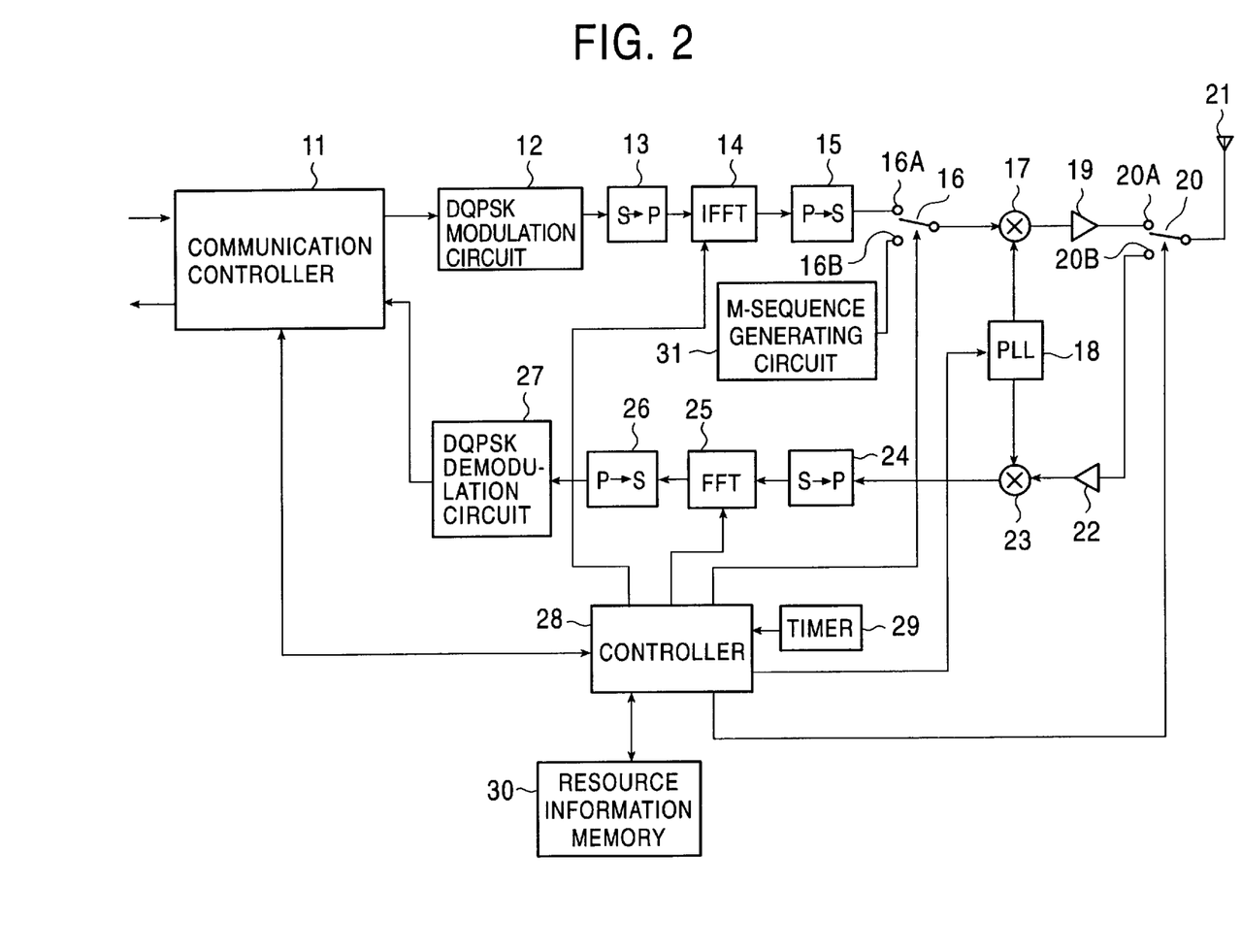
FIG. 2 is a block diagram of a radio communication unit in a radio communication control terminal in the radio LAN system.

FIG. 2 shows a configuration of the radio communication unit 105 in the radio communication control terminal 102. In FIG. 2, there is shown a communication controller 11. Through this communication controller 11, data is transferred with a data terminal.

The data to be transmitted from the controller 11 is supplied to a differentially encoded quadrature phase shift keying (DQPSK) modulation circuit 12. The DQPSK modulation circuit 12 modulates the data to be transmitted, by DQPSK.

The output of the DQPSK modulation circuit 12 is sent to a serial/parallel conversion circuit 13. The serial/parallel conversion circuit 13 converts serial data to parallel data. The output of the serial/parallel conversion data is sent to an inverse fast Fourier transform (IFFT) circuit 14. The IFFT circuit 14 performs mapping from the data to be transmitted to data in the frequency domain, and applies inverse Fourier transform to convert to data in the time domain. The output of the IFFT circuit 14 is sent to a parallel/serial conversion circuit 15.

The serial/parallel conversion circuit 13, the IFFT circuit 14, and the parallel/serial conversion circuit 15 convert to a multi-carrier signal by the OFDM method. In the OFDM method, with the use of a plurality of sub carriers formed orthogonally at a frequency interval $f_0$ such that inter-code interference does not occur, a low-bit-rate signal is assigned to each sub carrier to obtain a high bit rate as a whole.

Figure 3:
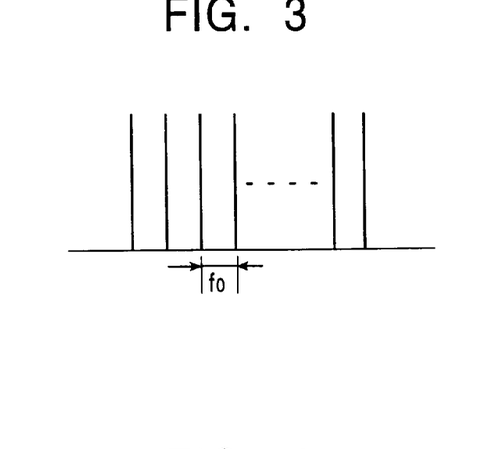
FIG. 3 is a spectrum diagram in the OFDM method.

FIG. 3 illustrates the spectra of transfer waveforms in the OFDM method. As shown in FIG. 3, a signal is transferred with the use of sub carriers orthogonal to each other at a frequency interval $f_0$ in the OFDM method.

In OFDM, signal generation is performed by mapping the signal to be transmitted onto the frequency domain and converting it from the frequency domain to the time domain by IFFT. Conversely, demodulation is performed by taking a received waveform at an interval of $f_0$ and converting the signal in the time domain into the signal in the frequency domain by FFT.

Figure 4:
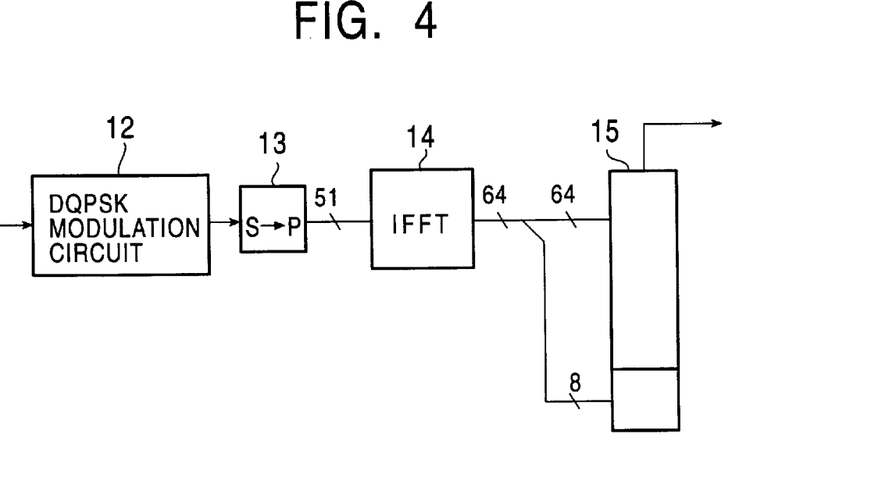
FIG. 4 is a block diagram illustrating the OFDM modulation in the radio LAN system.

In the above case, as shown in FIG. 4, the serial/parallel conversion circuit 13 converts 51 samples, which are output from the DQPSK modulation circuit 12, to parallel data, and maps onto the frequency domain. The output of the serial/parallel conversion circuit 13 is converted to data in the time domain by the IFFT circuit 14. The IFFT circuit 14 outputs an effective symbol with 64 samples. A guard interval of eight symbols is added to this effective symbol with the 64 samples.

Figure 5:
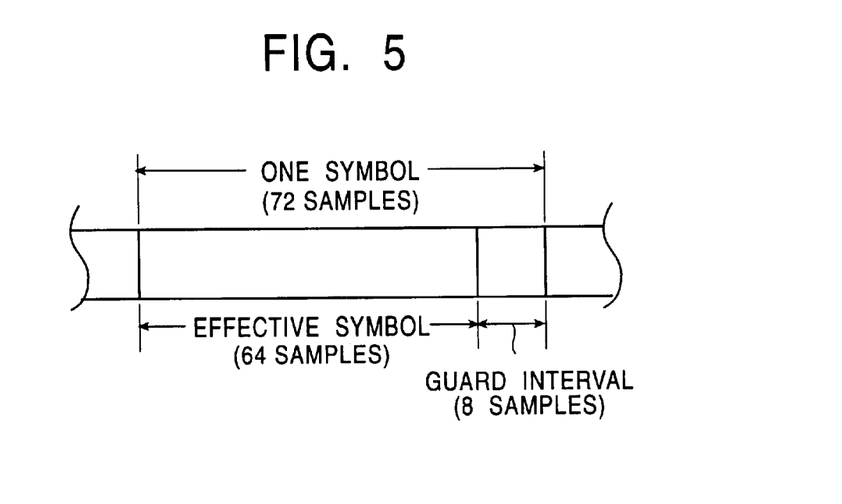
FIG. 5 is a view showing one symbol used in the OFDM modulation in the radio LAN system.

Therefore, in this case, as shown in FIG. 5, one symbol, which has 72 samples, is formed of the effective symbol having the 64 samples and the guard interval having the 8 samples. A symbol period $T_{symbol}$ is, for example, 1.953 microseconds, a sample period $T_{sample}$ is, for example, 27.127 nanoseconds, and a sample frequency $f_{sample}$ is, for example, 36.864 MHz.

In the OFDM method, since data is separately transmitted with a plurality of sub carriers, the time required to transfer one symbol becomes long. Because the guard interval is provided in the time axis, the data is unlikely to be affected by jitter and multi-paths. The guard interval is set to have a length about 10% to 20% of that of the effective symbol.

In the OFDM method, it is required that the effective symbol be taken out of a continuous receiving signal in FFT in demodulation and FFT be applied. Even if an error occurs due to jitter in taking out the effective symbol, since the guard interval is provided, the frequency components do not change and only a phase difference is generated. Therefore, demodulation is possible by performing phase compensation with a known pattern being inserted into a signal, or by eliminating the phase difference with the use of differential coding. In a usual QPSK modulation only, timing should be adjusted for each bit. In the OFDM method, sensitivity deteriorates by only several decibels even with a several-bit shift and demodulation is possible.

In FIG. 2, the output of the parallel/serial conversion circuit 15 is sent to a terminal 16A of a switch circuit 16. The output of an maximum length code (M-sequence) generating circuit 31 is sent to a terminal 16B of the switch circuit 16.

The output of the switch circuit 16 is sent to a frequency conversion circuit 17. The frequency conversion circuit 17 receives a local oscillation signal from a PLL synthesizer 18. The signal to be transmitted is converted to a signal having the specified frequency in the frequency conversion circuit 17. It is considered that the 2.4-GHz, 5.7-GHz, and 19-GHz bands, which are close to the micro-wave band, are, for example, used as transmission frequencies.

The output of the frequency conversion circuit 17 is sent to a power amplifier 19. The power amplifier 19 power-amplifies the signal to be transmitted. The output of the power amplifier 19 is sent to a terminal 20A of a switch circuit 20. The switch circuit 20 switches at transmission and at receiving. The switch circuit 20 is switched to the terminal 20A side in data transmission. The output of the switch circuit 20 is sent to an antenna 21.

A received signal at the antenna 21 is sent to the switch circuit 20. The switch circuit 20 is switched to the terminal 20B side at data receiving. The output of the switch circuit 20 is amplified through a low noise amplifier (LNA) 22 and then sent to a frequency conversion circuit 23.

The frequency conversion circuit 23 receives a local oscillation signal from the PLL synthesizer 18, and converts the received signal to an intermediate-frequency signal.

The output of the frequency conversion circuit 23 is sent to a serial/parallel conversion circuit 24. The output of the serial/parallel conversion circuit 24 is sent to an FFT circuit 25. The output of the FFT circuit 25 is sent to a parallel/serial conversion circuit 26.

The serial/parallel conversion circuit 24, the FFT circuit 25, and the parallel/serial conversion circuit 26 perform demodulation in the OFDM method. The serial/parallel conversion circuit 24 takes out effective data, samples the received waveform at an interval $f_0$, and converts to parallel data. The output of the serial/parallel conversion circuit 24 is sent to the FFT circuit 25. The FFT circuit 25 converts the signal in the time domain to a signal in the frequency domain. Demodulation in the OFDM method is performed in this way by applying FFT to the waveform sampled at the interval $f_0$.

The output of the parallel/serial conversion circuit 26 is sent to a DQPSK demodulation circuit 27. The DQPSK demodulation circuit 27 performs DQPSK demodulation processing. The output of the DQPSK demodulation circuit 27 is sent to the communication controller 11. The communication controller 11 outputs the received data.

A controller 28 controls the whole operations. According to directions from the controller 28, the communication controller 11 controls data transmission and data receiving.

In this system, data is transmitted in units of frames in the TDMA method. The M-sequence code for acquiring synchronization is sent as one symbol at the top of a frame. To implement such control, the radio communication unit 105 in the radio communication control terminal 102 is provided with the M-sequence generating circuit 31, a resource information memory 30, and a timer 29. At the timing of the symbol at the top of a frame, the switch circuit 16 is switched to the terminal 16B side. With this operation, a one-symbol M sequence is transmitted at the timing of the top of the frame.

When a transmission request is sent from any of the radio communication units 104A, 104B, . . . in the radio communication terminals 101A, 101B, . . . , the transmission request is received at the antenna 21, OFDM-demodulated in the FFT circuit 25, DQPSK-demodulated in the DQPSK demodulation circuit 27, and sent to the communication controller 11. The demodulated received data is sent from the communication controller 11 to the controller 28.

The controller 28 is provided with the resource information memory 30. This resource information memory 30 stores resource information related to the time period in a frame assigned to each of the radio communication terminals 101A, 101B, . . . . The controller 28 determines the time period assigned to each of the radio communication terminals 101A, 101B, . . . for transmission according to the received transmission request and the remaining communication resources. The controller 28 sends control information for this transmission assignment to the communication controller 11. Data sent from the communication controller 11 is DQPSK-modulated in the DQPSK modulation circuit 12, OFDM-converted in the IFFT circuit 14, and transmitted from the antenna 21 to the radio communication units 104A and 104B in the radio communication terminals 101A and 101B.

Figure 6:
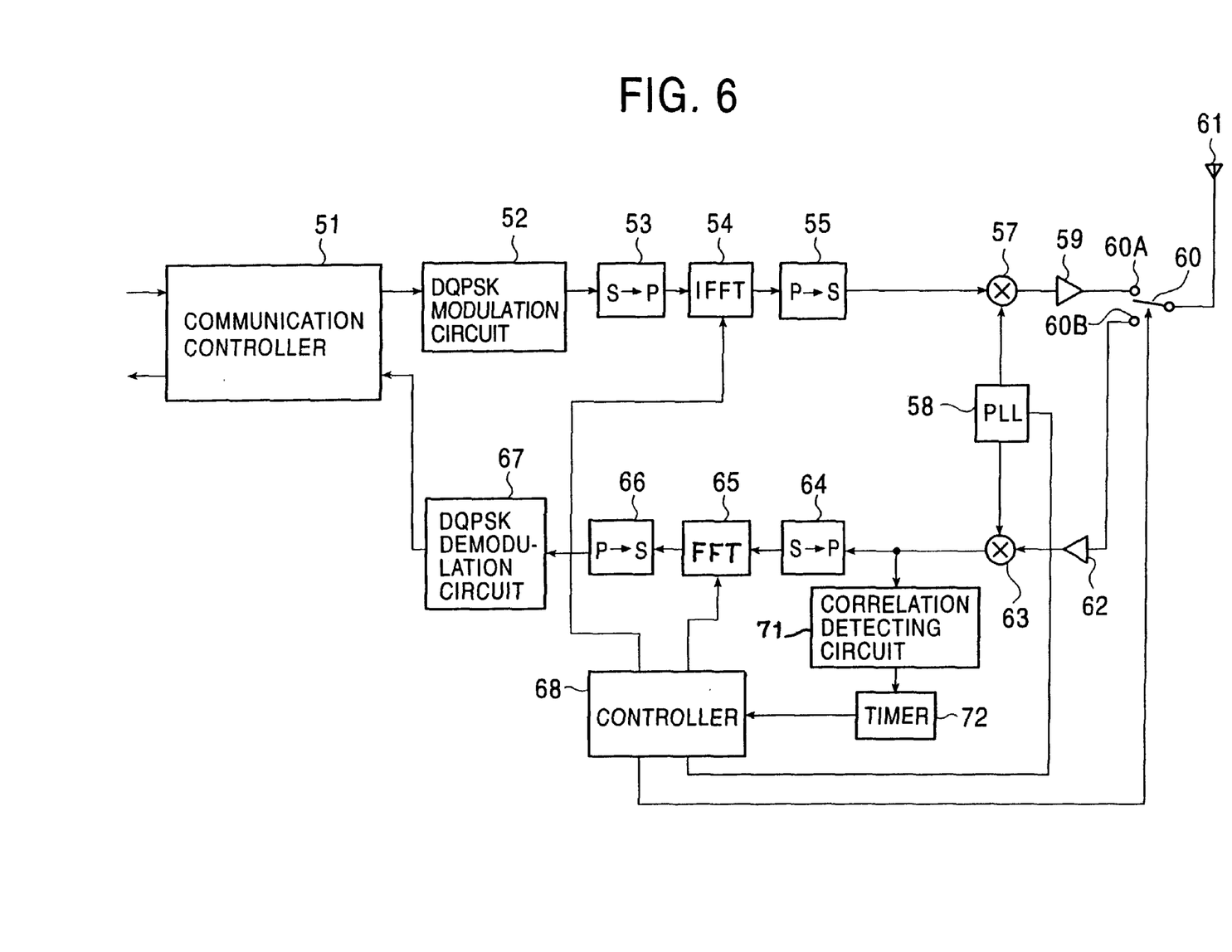
FIG. 6 is a block diagram of a radio communication unit in a radio communication terminal in the radio LAN system.

FIG. 6 shows a configuration of each of the radio communication units 104A, 104B, . . . of the radio communication terminals 101A, 101B, . . . . In FIG. 6, the data to be transmitted is input through a communication controller 51. The data to be transmitted, sent from the controller 51, is supplied to a DQPSK modulation circuit 52. The DQPSK modulation circuit 52 modulates the data to be transmitted, by DQPSK.

The output of the DQPSK modulation circuit 52 is sent to a serial/parallel conversion circuit 53. The serial/parallel conversion circuit 53 converts serial data to parallel data. The output of the serial/parallel conversion circuit 53 is sent to an IFFT circuit 54. The IFFT circuit 54 performs mapping from the data to be transmitted to data in the frequency domain, and applies inverse Fourier transform to convert to data in the time domain. The output of the IFFT circuit 54 is sent to a parallel/serial conversion circuit 55. The serial/parallel conversion circuit 53, the IFFT circuit 54, and the parallel/serial conversion circuit 55 convert to a multi-carrier signal by the OFDM method.

The output of the parallel/serial conversion circuit 55 is sent to a frequency conversion circuit 57. The frequency conversion circuit 57 receives a local oscillation signal from a PLL synthesizer 58. The signal to be transmitted is converted to a signal having the specified frequency in the frequency conversion circuit 57.

The output of the frequency conversion circuit 57 is sent to a power amplifier 59. The power amplifier 59 power-amplifies the signal to be transmitted. The output of the power amplifier 59 is sent to a terminal 60A of a switch circuit 60. The switch circuit 60 is switched to the terminal 60A side at data transmission. The output of the switch circuit 60 is sent to an antenna 61.

A received signal at the antenna 61 is sent to the switch circuit 60. The switch circuit 60 is switched to the terminal 60B side at data receiving. The output of the switch circuit 60 is amplified through an LNA 62 and then sent to a frequency conversion circuit 63.

The frequency conversion circuit 63 receives a local oscillation signal from the PLL synthesizer 58, and converts the received signal to an intermediate-frequency signal.

The output of the frequency conversion circuit 63 is sent to a correlation detecting circuit 71 as well as to a serial/parallel conversion circuit 64.

The output of the serial/parallel conversion circuit 64 is sent to an FFT circuit 65. The output of the FFT circuit 65 is sent to a parallel/serial conversion circuit 66. The serial/parallel conversion circuit 64, the FFT circuit 65, and the parallel/serial conversion circuit 66 perform demodulation in the OFDM method.

The output of the parallel/serial conversion circuit 66 is sent to a DQPSK demodulation circuit 67. The DQPSK demodulation circuit 67 performs DQPSK demodulation processing. The output of the DQPSK demodulation circuit 67 is sent to the communication controller 51. The communication controller 51 outputs the received data.

A controller 68 controls the whole operations. According to directions from the controller 68, the communication controller 51 controls data transmission and data receiving.

In this system, data is transmitted in units of frames in the TDMA method. The M-sequence code for acquiring synchronization is sent as one symbol at the top of a frame from the radio communication unit 105 in the radio communication control terminal 102. To implement such control, each of the radio communication units 104A, 104B, . . . is provided with the correlation detecting circuit 71 and a timer 72. At the timing of the top of a frame, the M sequence sent from the radio communication unit 105 in the radio communication control terminal 102 is received at the antenna 61 and sent to the correlation detecting circuit 71. The correlation detecting circuit 71 detects the correlation between the received code and the code specified in advance. When it is determined that the correlation is high, a correlation detection signal is output. The correlation detecting circuit 71 can be implemented, for example, by a matched filter. The output of the correlation detecting circuit 71 is sent to the timer 72. The time in the timer 72 is set according to a correlation detection signal sent from the correlation detecting circuit 71.

When data is to be transmitted, the communication controller 51 sends a transmission request according to a command from the controller 68. This transmission request is DQPSK-modulated in the DQPSK modulation circuit 52, OFDM-converted in the IFFT circuit 54, and transmitted from the antenna 61 toward the radio communication control terminal 102. The radio communication control terminal 102 receives the transmission request, and returns control information, including a transmission assignment time.

This control information is received at the antenna 61, OFDM-demodulated in the FFT circuit 65, DQPSK-demodulated in the DQPSK demodulation circuit 67, and sent to the communication controller 51. The demodulated received data is sent from the communication controller 51 to the controller 68.

This control information includes information related to transmission times. These times are set with the time in the timer 72 being used as the reference. The timer 72 has been set according to the output of the correlation detecting circuit 71 at the timing of the M sequence sent from the radio communication control terminal.

When the timer 72 determines that the transmission start time has come, the communication controller 51 outputs the data to be transmitted according to a command from the controller 68. The data to be transmitted is DQPSK-modulated in the DQPSK modulation circuit 52, OFDM-converted in the IFFT circuit 54, and output from the antenna 61. When the timer 72 determines that the receiving time has come, the FFT circuit 65 performs demodulation processing for the received data according to a command from the controller 68.

As described above, in this system, data is transferred by OFDM with the use of multi-carriers. An OFDM wave is unsusceptible to jitter and demodulation is possible even with a several-sample shift as described before. If the shift extends more onto two symbols, however, demodulation becomes impossible. Therefore, it is required to adjust the timing to some extent. In this system, for example, one frame is formed of 147455 symbols (four milliseconds), data is transferred within a frame by the TDMA method, the M sequence is disposed at the top symbol of each frame, and the demodulation timing is set with the use of this M sequence.

When the receiving clock is shifted from the received OFDM wave by 6.8 ppm, a time difference of 27.2 nanoseconds is accumulated with in one frame, which lasts four milliseconds. This corresponds to a sampling rate of 36.864 MHz. Therefore, demodulation is positively performed with a clock having a precision of about 6.8 ppm.

As a synchronization symbol, the Gold code, which is a code sequence obtained by adding two types of M sequences having the same period, the Barker code, and the Kasami code can be used, instead of the M-sequence code.

Figure 7:
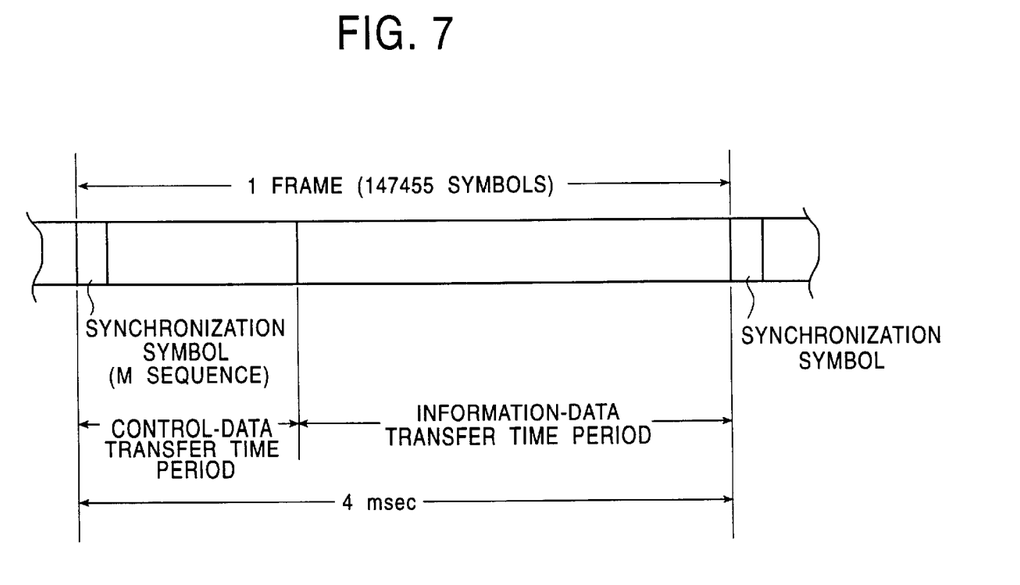
FIG. 7 is a view showing a frame structure in the radio LAN system.

FIG. 7 shows a configuration of one frame. As shown in FIG. 7, one frame is divided into a control-data transfer time period and an information-data transfer time period. In the control-data transfer time period, data communication is performed in an asynchronous manner. In the information-data transfer time period, data communication is performed in an isochronous manner. Communication in which the radio communication control terminal 102 transmits a synchronization symbol, each of the radio communication terminals 101A, 101B, . . . transmits a transmission request to the radio communication control terminal 102, and the radio communication control terminal 102 transmits control information, including transmission assignment, to each of the radio communication terminals 101A, 101B, . . . is performed in the control-data transfer time period in an asynchronous manner. According to the transmission assignment time, data communication between the radio communication terminals 101A, 101B, . . . is performed in the information-data transfer time period in an isochronous manner.

Data communication can be performed in an asynchronous manner in the information-data transfer time period.

Asynchronous communication and isochronous communication can be achieved together in the period.

Figure 8:
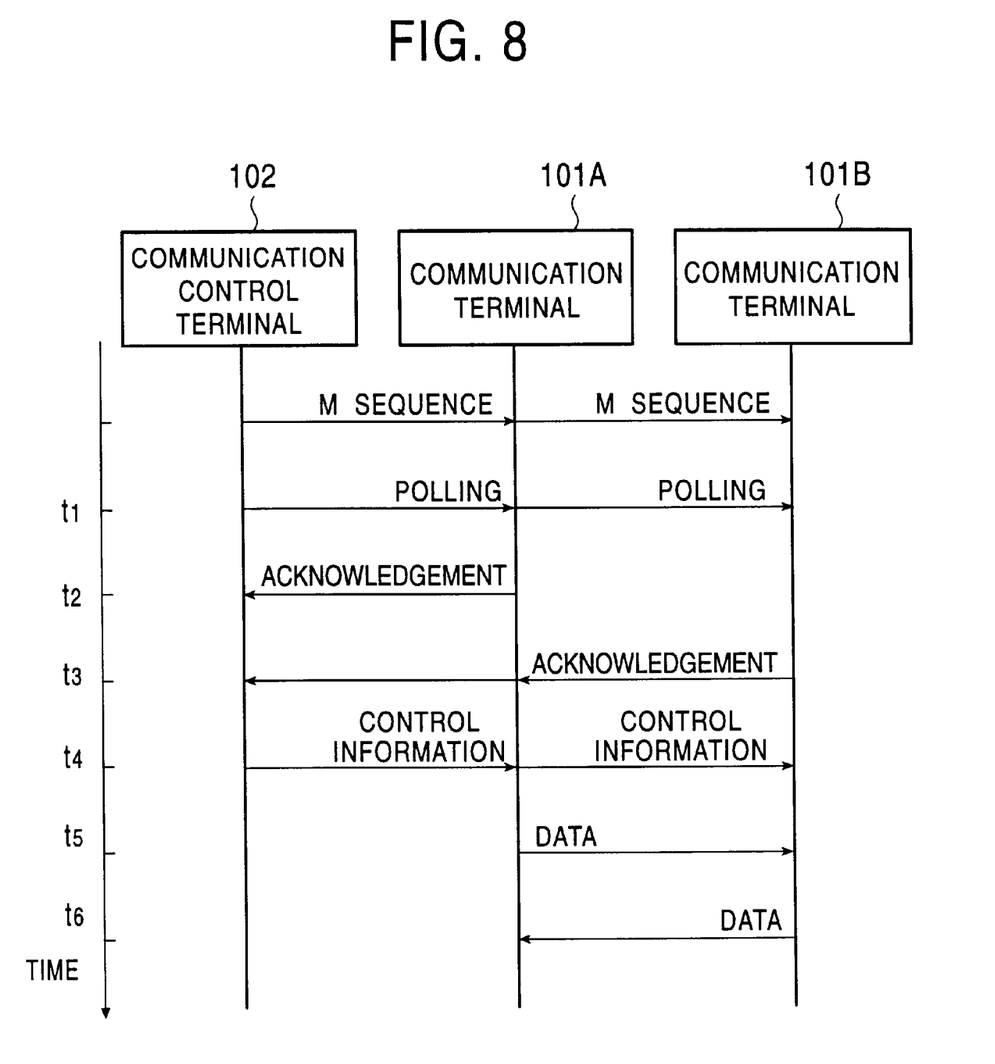
FIG. 8 is a sequence diagram of the radio LAN system.
Figure 9:
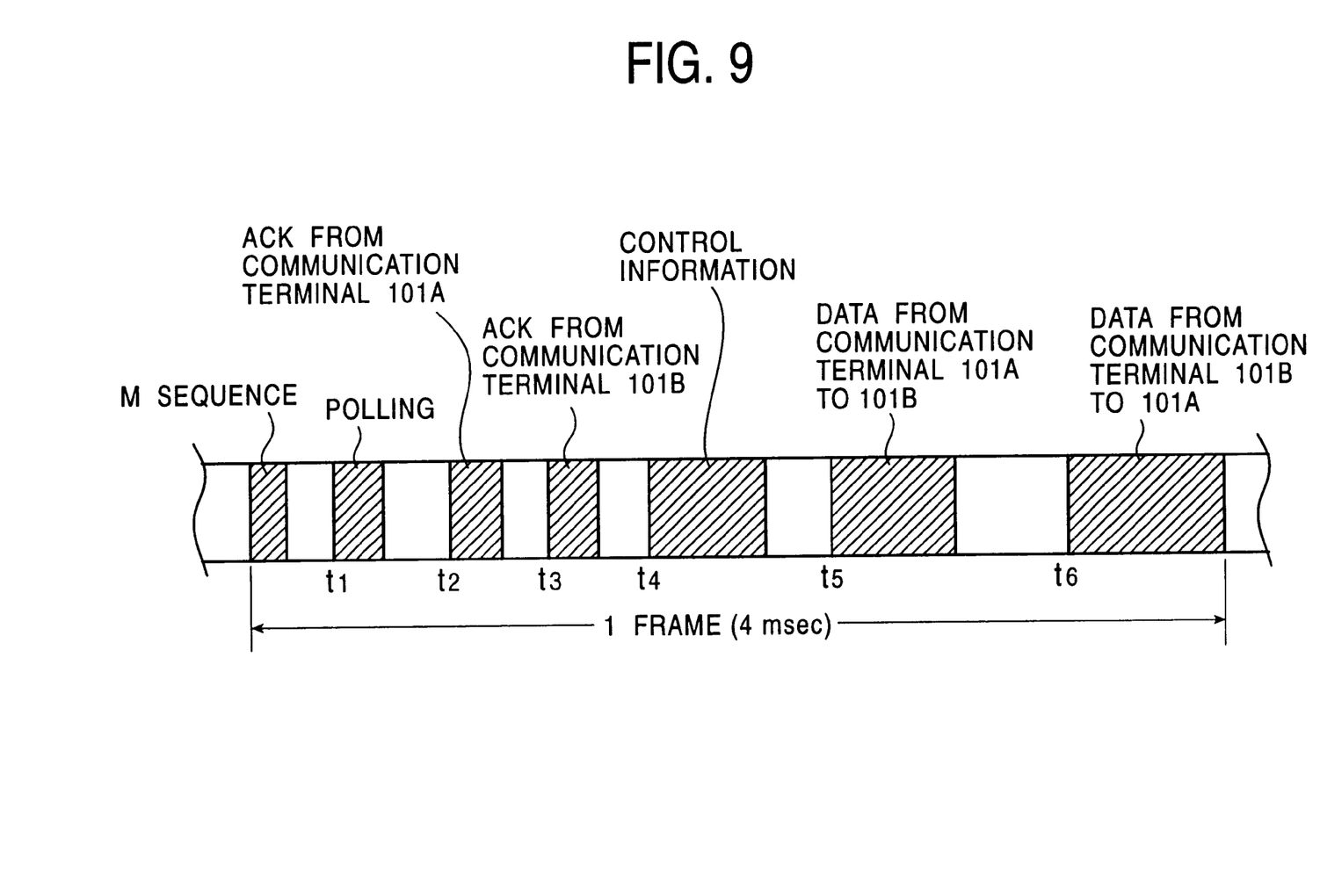
FIG. 9 is a view illustrating a frame structure in the radio LAN system.

Assume, for example, that data communication is performed between the radio communication terminal 101A and the radio communication terminal 101B in FIG. 1. In this case, processing such as that shown in a sequence diagram in FIG. 8 is performed. Data communication is performed in a frame by TDMA as shown in FIG. 9.

As shown in FIG. 8, the radio communication unit 105 in the radio communication control terminal 102 sends the M sequence to each of the radio communication units 104A, 104B, . . . of the radio communication terminals 101A, 101B, . . . at the first symbol of a frame. The radio communication units 104A and 104B of the radio communication terminals 101A and 101B receive the M sequence. The timer 72 in each unit is set according to the M sequence.

At a time $t_1$, the communication unit 105 in the radio communication control terminal 102 calls the radio communication terminals 101A, 101B, . . . . When receiving the calls, the communication units 104A, 104B, . . . of the radio communication terminals 101A, 101B, . . . return acknowledge signals at times $t_2$ and $t_3$. When transmission is to be requested, an acknowledge signal includes a transmission request. There is assumed here, for example, that a data transfer is requested from the radio communication terminal 101A to the radio communication terminal 101B and a data transfer is requested from the radio communication terminal 101B to the radio communication terminal 101A.

The radio communication unit 105 of the radio communication control terminal 102 determines transmission assignment time periods according to these transmission requests. The radio communication unit 105 determines, for example, that data transfer from the radio communication terminal 101A to the radio communication terminal 101B starts at a time $t_5$, and data transfer from the radio communication terminal 101B to the radio communication terminal 101A starts at a time $t_6$.

At a time $t_4$, the communication unit 105 of the radio communication control terminal 102 transmits a control signal, including the transmission assignment time periods, to each of the radio communication units 104A, 104B, . . . in the radio communication terminals 101A, 101B. . . . .

When the time $t_5$ is reached with the timer 72 which has been set by the received M sequence being used as the reference, the radio communication terminal 101A starts data transfer to the radio communication terminal 101B. When the time $t_6$ is reached with the timer 72 being used as the reference, the radio communication terminal 101B starts data transfer to the radio communication terminal 101A.

FIG. 9 shows the above operations in one frame in the time domain. As shown in FIG. 9, data is transferred in a frame in a time division manner. In other words, the M sequence is transmitted at the top of a frame, each of the radio communication terminals 101A, 101B, . . . is called at the time $t_1$, the acknowledge signals in response to the callings are returned at the times $t_2$ and $t_3$, the control signal, including the transmission assignment time periods, is transmitted at the time $t_4$, the radio communication terminal 101A starts data transfer to the radio communication terminal 101B at the time $t_5$, and the radio communication terminal 101B starts data transfer to the radio communication terminal 101A at the time $t_6$.

As described above, since the system employs the OFDM method, a high data rate is allowed. Data communication is performed in units of frames in TDMA, the M sequence is transmitted at the top of a frame, and the timing of transmission and receiving is set with this M sequence being used as the reference.

The radio communication control terminal 102 specifies the transmission time and the receiving time for each of the radio communication terminals 101A, 101B, . . . by control information. Since the timing of transmission and receiving is set with the M sequence at the top of a frame being used as the reference, the timer 72 of each of the radio communication terminals 101A, 101B, . . . is set to the same time. Therefore, with the use of this time information, only necessary symbols are demodulated in a frame to reproduce the data at receiving. In addition, when data is multiplexed in a frame from a plurality of radio communication terminals 101A, 101B, . . . , even if jitter occurs, demodulation is allowed at the same demodulation timing. Therefore, signals coming from a plurality of radio communication terminals 101A, 101B, . . . are received separately at the same time to implement data transfer.

Even if there is a small difference between the timer at the transmission side and that at the receiving side, demodulation can be performed without an error due to the nature of OFDM. Therefore, neither synchronization acquisition is required prior to receiving at each burst, nor a synchronization bit is required to be disposed for each burst. Therefore, the bits in a frame are effectively used.

Figure 10:
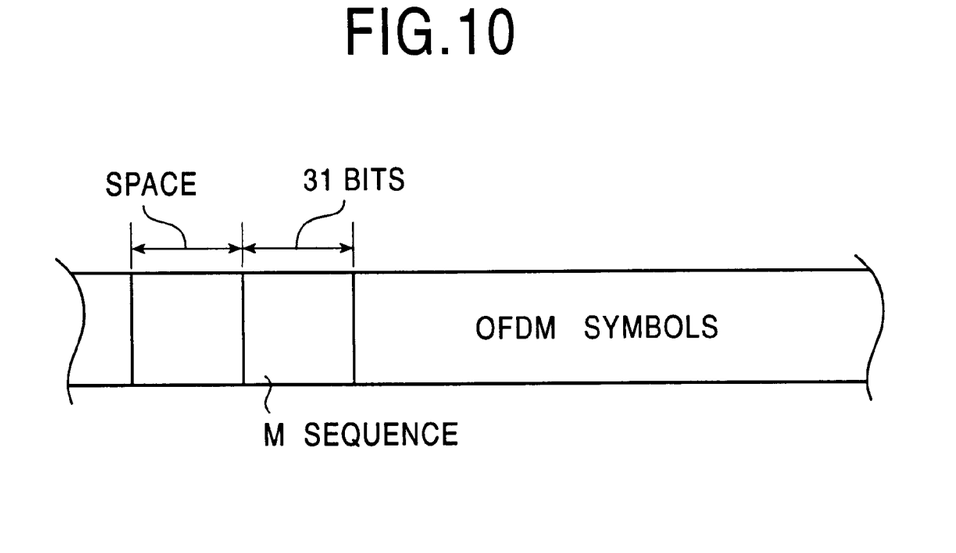
FIG. 10 is a view illustrating OFDM symbols in the radio LAN system.

In the above embodiment, the N sequence corresponding to one symbol in OFDM is transmitted at the top of a frame. This synchronization symbol is not limited to one OFDM symbol. This synchronization symbol is variable in length. As shown in FIG. 10, the length of the M sequence may be set to 31 bits, which is shorter than one symbol, to leave a space at the top of a frame. The length may be set longer than one symbol. The M sequence used for frame synchronization is not necessarily disposed at the top of a frame. M sequences for frame synchronization may be disposed at a plurality of positions in a frame.

Figure 11:
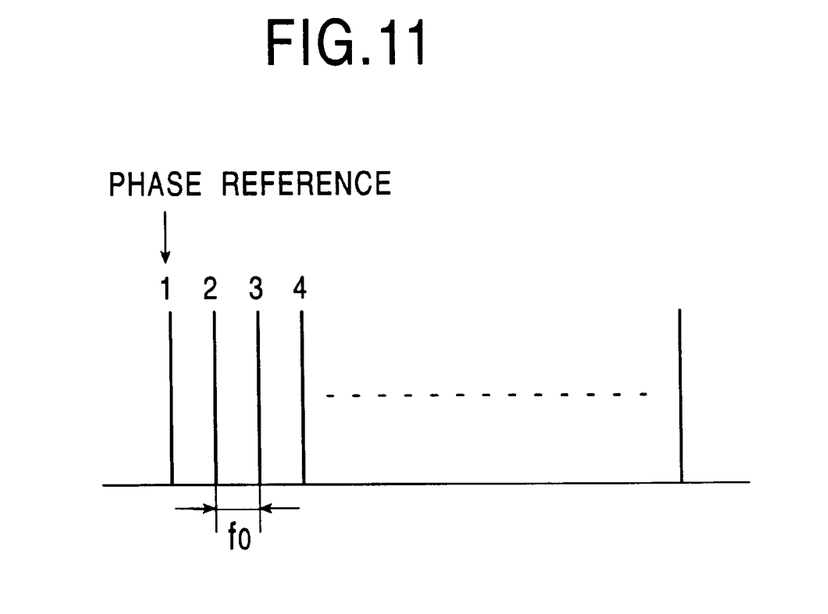
FIG. 11 is a spectrum diagram in the radio LAN system.

Furthermore, as shown in FIG. 11, information may be allocated to a phase difference between sub-carriers. Differential operations are performed in the frequency domain in DQPSK modulation. If a sampling timing is shifted at receiving, the phase of the QPSK wave of each sub-carrier shifts at FFT in OFDM demodulation. Therefore, to obtain the correct QPSK phase, a method is used in which a part of OFDM sub-carriers is assigned to a signal having a known phase as a pilot signal and used as the phase reference. In the case shown in FIG. 11, information is allocated to a phase difference between sub-carriers with the first carrier being used as the reference. Since the amount of rotation between sub-carriers is small if the phases rotate, an error is small. In FIG. 11, the phase reference is assigned to the first carrier. It may be assigned to other carriers.

In the above embodiment, data is DQPSK-modulated and transferred with multi-carriers by OFDN. The quadrature amplitude modulation (QAN), which is a multi-value modulation, may be used. QAN uses 16 values, 32 values, or 128 values. The Trellis code modulation may also be used after data is coded.

In the above embodiment, the radio communication unit 105 of the radio communication control terminal 102 is provided with the N-sequence generating circuit 31, and each of the radio communication u nit s 104A, 104B, . . . of the radio communication terminals 101A, 101B, . . . is provided with the correlation detecting circuit 71. The system may be configured such that the M-sequence generating circuit and the correlation detecting circuit are provided for one radio communication unit, and the e-sequence generating circuit and the correlation detecting circuit are switched according to whether the unit is used in a radio communication control terminal or a radio communication terminal.

According to the present invention, data is transmitted by the OFDN method and data communication is performed in units of frames by TDNA. The N sequence is transmitted at the top of a frame, the timing of transmission and receiving is set with the M sequence being used as the reference, and the transmission start time is specified for each radio communication terminal by control information from the radio communication control terminal. With the use of the OFDM method, the transfer rate can be increased due to the nature of OFDM, and demodulation is performed without an error even if jitter occurs. Since the timing of transmission and receiving is specified with the M sequence at the top of a frame being used as the reference, the timer of each radio communication terminal is set to the same time. With the use of this time information, only necessary symbols in a frame are demodulated to reproduce the data at receiving. Therefore, neither synchronization acquisition is required prior to receiving for each burst nor synchronization bit is required for each burst. Consequently, the bits in a frame can be effectively used.

What is claimed is:

1. A radio communication system comprising:

a plurality of radio communication terminals for data communication; and a radio communication control terminal for controlling radio communication, wherein said radio communication control terminal includes first transmission means for performing data transmission by orthogonal frequency division multiplexing (OFDM), first receiving means for receiving said data transmission by said OFDM, and synchronization-code generating means for generating a code sequence for synchronization acquisition, and wherein each of said plurality of radio communication terminals includes second transmission means for performing said data transmission by said OFDM, second receiving means for receiving said data transmission by said OFDM, synchronization-code detecting means for detecting said code sequence for said synchronization acquisition, and timer means set by said synchronization-code detecting means, wherein data is modulated by said OFDM and multiplexed by TDMA time division multiple access (TDMA) with a frame structure having a specified number of symbols between each of said plurality of radio communication terminals and said radio communication control terminal, said radio communication control terminal transmits said code sequence for said synchronization acquisition to said plurality of radio communication terminals in each of a plurality of frames, and each of said plurality of radio communication terminals receives said code sequence for said synchronization acquisition, compares said code sequence to a predetermined code, sets said timer means according to a receiving timing of said code sequence for said synchronization acquisition, and sets a transmission timing and said receiving timing with said timer means used as a reference.

2. The radio communication system as set forth in claim 1, wherein said code sequence for said synchronization acquisition corresponds to one symbol of said specified number of symbols in said OFDM.

3. The radio communication system as set forth in claim 1, wherein said code sequence for said synchronization acquisition is a variable-length packet.

4. The radio communication system as set forth in claim 1, wherein said code sequence for said synchronization acquisition is an M-sequence code.

5. The radio communication system as set forth in claim 1, wherein said code sequence for said synchronization acquisition is a Gold code.

6. The radio communication system as set forth in claim 1, wherein each of a plurality of sub-carriers in said OFDM is used in differentially encoded quadrature phase shift keying modulation.

7. The radio communication system as set forth in claim 1, wherein each of a plurality of sub-carriers in said OFDM is used in Quadrature Amplitude Modulation.

* * * * *